(12) United States Patent
Liang et al.

(10) Patent No.: US 11,928,644 B2
(45) Date of Patent: Mar. 12, 2024

(54) ARTICLES PICKING METHOD, CONTROL SYSTEM AND ARTICLES PICKING SYSTEM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Zhikang Liang, Beijing (CN); Xiaofei Qi, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 739 days.

(21) Appl. No.: 17/051,607

(22) PCT Filed: May 15, 2019

(86) PCT No.: PCT/CN2019/087088
§ 371 (c)(1),
(2) Date: Oct. 29, 2020

(87) PCT Pub. No.: WO2019/233257
PCT Pub. Date: Dec. 12, 2019

(65) Prior Publication Data
US 2021/0233013 A1    Jul. 29, 2021

(30) Foreign Application Priority Data
Jun. 8, 2018  (CN) .......................... 201810584011.7

(51) Int. Cl.
*G06Q 10/087* (2023.01)
*B65G 1/137* (2006.01)
*G05D 1/00* (2006.01)

(52) U.S. Cl.
CPC ......... *G06Q 10/087* (2013.01); *B65G 1/1375* (2013.01); *G05D 1/0217* (2013.01); *G05D 1/0287* (2013.01); *G05D 2201/0216* (2013.01)

(58) Field of Classification Search
CPC .. G06Q 10/087; B65G 1/1375; G05D 1/0217; G05D 1/0287; G05D 2201/0216
See application file for complete search history.

(56) References Cited

U.S. PATENT DOCUMENTS

| 4,611,845 A | * | 9/1986 | Flemming | ............ B25J 15/0052 |
| | | | | 294/87.28 |
| 8,798,784 B1 | * | 8/2014 | Clark | ........................ G06F 7/00 |
| | | | | 700/214 |

(Continued)

FOREIGN PATENT DOCUMENTS

| CN | 105858045 A | 8/2016 |
| CN | 106204222 A | 12/2016 |

(Continued)

OTHER PUBLICATIONS

International Search Report dated Jul. 31, 2019 in PCT/CN2019/087088 filed on May 15, 2019, 2 pages.

(Continued)

*Primary Examiner* — Kyle O Logan
(74) *Attorney, Agent, or Firm* — Oblon, McClelland, Maier & Neustadt, L.L.P.

(57) ABSTRACT

The disclosure provides an articles picking method, a control system and an articles picking system, and relates to the technical field of intelligent warehousing. The articles picking method of the present disclosure includes: receiving an order of a single articles picking point of an AGV arriving at an articles picking point, the order of the single articles picking point comprising information of articles belonging to a same articles picking point in one or more orders associated with the AGV; recommending the order of the (Continued)

single articles picking point to articles pickers of no less than a predetermined number; setting the order of the single articles picking point to be an assigned state to avoid the order of the single articles picking point being picked repeatedly in the event that there is an articles picker taking the order of the single articles picking point.

20 Claims, 7 Drawing Sheets

(56) References Cited

U.S. PATENT DOCUMENTS

| | | | |
|---|---|---|---|
| 2016/0229631 A1 | 8/2016 | Kimura et al. | |
| 2017/0066592 A1* | 3/2017 | Bastian, II | B25J 5/007 |
| 2018/0096299 A1 | 4/2018 | Jarvis et al. | |
| 2018/0305124 A1* | 10/2018 | Guo | B65G 1/10 |
| 2021/0233013 A1* | 7/2021 | Liang | G06Q 10/087 |

FOREIGN PATENT DOCUMENTS

| | | |
|---|---|---|
| CN | 106843201 A | 6/2017 |
| CN | 106845674 A | 6/2017 |
| CN | 107215606 A | 9/2017 |
| CN | 107248096 A | 10/2017 |
| CN | 107256469 A | 10/2017 |
| CN | 107539690 A | 1/2018 |
| CN | 107628404 A | 1/2018 |
| CN | 107633375 A | 1/2018 |
| CN | 107703943 A | 2/2018 |
| CN | 108100548 A | 6/2018 |

OTHER PUBLICATIONS

Combined Chinese Office Action and Search Report dated Nov. 8, 2021 in Chinese Patent Application No. 201810584011.7 (with English translation of Categories of Cited Documents), 13 pages.

"Research on Order Picking Optimization of E-commerce under Goods to People Mode" National Social Sciences Database, Sep. 15, 2015, pp. 124-127 (with partial English translation).

"Application of AGV System in Logistics Sorting" National Social Sciences Database, Jun. 18, 2017, 3 pages (with partial English translation).

* cited by examiner

ARTICLES PICKING METHOD, CONTROL SYSTEM AND ARTICLES PICKING SYSTEM

CROSS-REFERENCE TO RELATED APPLICATIONS

The present disclosure is a U.S. National Stage Application under 35 U.S.C. § 371 of International Patent Application No. PCT/CN2019/087088, filed on May 15, 2019, which is based on and claims the benefit of priority to the Chinese patent application No. 201810584011.7 filed on Jun. 8, 2018, the disclosure of both of which are hereby incorporated by reference in its entirety into the present application.

TECHNICAL FIELD

The disclosure relates to the technical field of intelligent warehousing, in particular to an articles picking method, a control system and an articles picking system.

BACKGROUND

In an e-commerce order fulfillment warehouse process of the related art, the system often combines a plurality of orders together to form a list of tasks, and then distributes the list of tasks to articles pickers for articles picking. The current WMS (Warehouse Management System) has 2 major types of ways to perform articles picking tasks:

The first type: a single articles picker independently completes the whole articles picking task. The articles picking path is the sequence of the main aisle in which the storage positions of the articles picking tasks are located. This method is completely dependent on manpower, and one articles picker completes the whole articles picking task.

The second type: multiple persons complete one articles picking task in a relay manner. Each articles picker is responsible for a part of areas, and after a person in the front finishes the articles picking task of his own area, the task can be passed to a person behind him through the delivery line.

SUMMARY

According to an aspect of some embodiments of the present disclosure, there is provided an articles picking method, comprising: receiving an order of a single articles picking point of an AGV arriving at an articles picking point, the order of the single articles picking point comprising information of articles belonging to a same articles picking point in one or more orders associated with the AGV; recommending the order of the single articles picking point to articles pickers of no less than a predetermined number; and setting the order of the single articles picking point to be an assigned state to avoid the order of the single articles picking point being picked repeatedly, in the event that there is an articles picker taking the order of the single articles picking point.

In some embodiments, recommending the order of the single articles picking point to articles pickers of not less than a predetermined number comprises: determining a travel distance between each online articles picker and the articles picking point, according to positions of the online articles picker and a position of the articles picking point where the AGV is located; selecting articles pickers of no less than a predetermined number from the online articles pickers according to a travel distance between each articles picker and the articles picking point; and recommending the order of the single articles picking point to the selected articles pickers.

In some embodiments, the articles picking method further comprises: maintaining a list of online articles pickers according to on-line information and off-line information of each articles picker; and updating the position of each articles picker in the list of online articles pickers in the articles picking point area before determining the travel distance between each articles picker and the articles picking point.

In some embodiments, the articles picking method further comprises: recommending the order of the single articles picking point to a corresponding articles picker according to a task refresh request from any articles picker; and suspending an operation of recommending the single articles picking point according to the task refresh request to articles pickers which locates in a same articles picking point area with the corresponding articles picker, until exceeding a predetermined interval.

In some embodiments, the articles picking method further comprises: determining articles picking points to be passed by an AGV associated with an order, according to articles required by the order and the storage positions of the articles; generating orders of the single articles picking point of the AGV for each articles picking point, according to the articles that the AGV needs at each articles picking point; planning a traveling route of the AGV; and driving the AGV to sequentially pass through each articles picking point according to the traveling route until the articles picking is completed.

In some embodiments, each AGV is associated with one or more orders, and the order of the single articles picking point comprises information of articles belonging to one or more orders that the AGV needs at a same articles picking point.

In some embodiments, the information according to which the travel route of the AGV is planned comprises one or more of: positions of the articles picking points that the AGV need to pass, position of an unloading point and a current position of the AGV; or the number of AGVs waiting at each articles picking point.

In some embodiments, the articles picking method further comprises: when the articles picker assigned with the order of the single articles picking point has finished the order of the single articles picking point, driving the AGV, to which the order of the single articles picking point belongs, to leave a current articles picking point and go to a next articles picking point according to the traveling rout, or go to an unloading point for unloading under the condition of finishing picking.

According to an aspect of other embodiments of the present disclosure, there is provided an articles picking control system, comprising: an order receiving module, configured to receive an order of a single articles picking point of an AGV arriving at an articles picking point, the order of the single articles picking point comprising information of articles belonging to a same articles picking point in one or more orders associated with the AGV; an order recommendation module, configured to recommend the order of the single articles picking point to articles pickers of no less than a predetermined number; and an order marking module, configured to the order of the single articles picking point to be an assigned state in the event that there is an articles picker taking the order of the single articles picking point, to avoid the order of the single articles picking point being picked repeatedly.

In some embodiments, the order recommendation module is configured to: determining a travel distance between each online articles picker and the articles picking point, according to positions of the online articles picker and a position of the articles picking point where the AGV is located; selecting articles pickers of no less than a predetermined number from the online articles pickers according to a travel distance between each articles picker and the articles picking point; and recommending the order of the single articles picking point to the selected articles pickers.

In some embodiments, the articles picking control system further comprises: an articles picker information maintenance module, configured to maintain a list of online articles pickers according to on-line information and off-line information of each articles picker, and update the position of each articles picker in the list of online articles pickers in the articles picking point area before an distance calculating unit determine the travel distance between each articles picker and the articles picking point.

In some embodiments, the articles picking control system further comprises: a refresh module, configured to recommend the order of the single articles picking point to a corresponding articles picker according to a task refresh request from any articles picker, and suspend an operation of recommending the single articles picking point according to the task refresh request to articles pickers which locates in a same articles picking point area with the corresponding articles picker, until exceeding a predetermined interval.

In some embodiments, the articles picking control system further comprises: an articles picking point determination module, configured to determine articles picking points to be passed by an AGV associated with an order, according to articles required by the order and the storage positions of the articles; an orders of single articles picking point determination module, configured to generate orders of the single articles picking point of the AGV for each articles picking point, according to the articles that the AGV needs at each articles picking point; a route planning module configured to plan a traveling route of the AGV; and a driving module, configured to drive the AGV to sequentially pass through each articles picking point according to the traveling route until the articles picking is completed.

In some embodiments, each AGV is associated with one or more orders, and the order of the single articles picking point comprises information of articles belonging to one or more orders that the AGV needs at a same articles picking point.

In some embodiments, the information according to which the route planning module plans the travel route for the AGV comprises one or more of: positions of the articles picking points that the AGV need to pass, position of an unloading point and a current position of the AGV; or the number of AGVs waiting at each articles picking point.

According to an aspect of still other embodiments of the present disclosure, there is provided an articles picking control system, including: a memory; and a processor coupled to the memory, the processor is configured to perform the any of the articles picking methods mentioned hereinabove based on instructions stored in the memory.

According to an aspect of still further embodiments of the present disclosure, a computer-readable storage medium is proposed, on which computer program instructions are stored, which instructions, when executed by a processor, implement the steps of any one of the above mentioned articles picking methods.

Additionally, according to an aspect of some embodiments of the present disclosure, there is provided an articles picking system comprising: any of the articles picking control systems mentioned hereinabove; and one or more AGVs, configured to travel to each articles picking point under the driving of the articles picking control system, and travel to an unloading point for unloading after an articles picking is completed.

In some embodiments, the articles picking system further comprises: one or more articles picker terminals, and each of the articles picker terminals is configured to perform one or more of the following operations: providing on-line information and off-line information of an articles picker to the articles picking control system under the trigger of the articles picker; receiving and displaying an order of a single articles picking point recommended to the articles picker; or in the event that the articles picker determines to take the order, providing an order taking information to the articles sorting control system.

BRIEF DESCRIPTION OF THE DRAWINGS

The drawings described here are used to provide a further understanding of the present disclosure and constitute a part of the present disclosure. The exemplary embodiments and descriptions of the present disclosure are used to explain the present disclosure, and do not constitute an improper limitation of the present disclosure. In the drawings.

DETAILED DESCRIPTION

The technical solution of the present disclosure is further described in detail by the accompanying drawings and embodiments.

In related technologies, the plan of a single articles picker to complete a whole picking task independently will cause a long walking distance, and the picking efficiency is low. Although the plan of multi-person relay to complete a picking task has some improvement, the deployment and implementation of the conveyor line in the warehouse is not convenient and flexible enough, thus this plan is difficult to apply.

Figure 1:
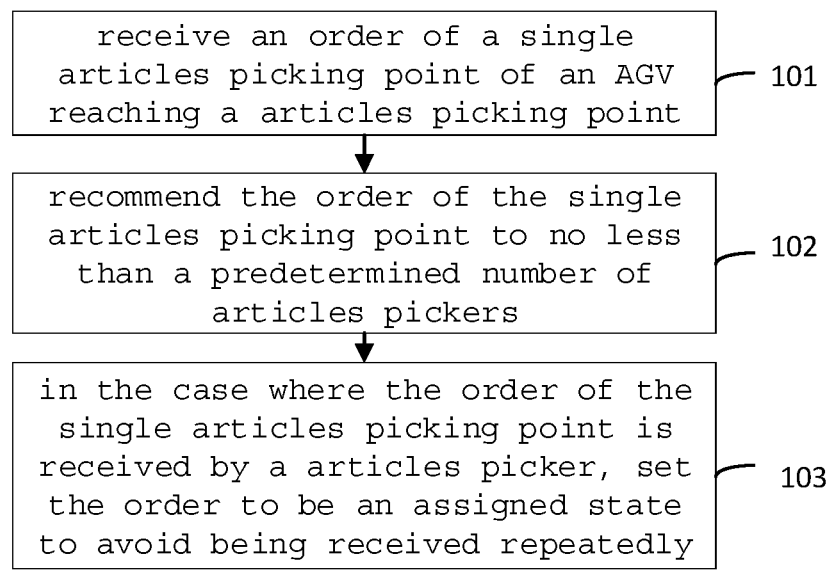
FIG. 1 is a flow diagram of some embodiments of the articles picking method of the present disclosure.

A flow diagram of some embodiments of an articles picking method of the present disclosure is shown in FIG. 1.

In step 101, an order of a single articles picking point of an AGV reaching an articles picking point is received. The order of the single articles picking point including information of articles belonging to an individual articles picking point in an order associated with the AGV. In some embodiments, the information of articles may include one or more of names, models, barcodes, two-dimensional codes, or other articles identification information, and may further include a desired quantity of the articles.

In some embodiments, a single AGV may be associated with one order, and the order of the single articles picking point including the information of the articles of one order that the AGV needs at the single articles picking point. By such method, secondary picking is not needed after the AGV finishes picking, and accordingly operation steps are reduced. The finishing efficiency of a single order is improved, and particularly under the condition that the order needs to be picked urgently, the time limit requirement can be met.

In other embodiments, a single AGV may be associated with multiple orders, and each order of the single articles picking point may include information about the articles of one or more orders that the AGV needs at the single articles picking point. By such method, the single AGV can be used for picking articles required by a plurality of orders synchronously, the time for completing each order is balanced, and the travel distance of the AGV is reduced.

In step 102, the order of the single articles picking point is recommended to no less than a predetermined number of articles pickers. In some embodiments, the predetermined number of articles pickers is 2.

In step 103, in the event that the order of the single articles picking point is taken by an articles picker, the order of the single articles picking point is set to be an assigned state to avoid being received repeatedly.

By this method, the AGV and the order can be associated, and the AGV can be used to travel to each articles picking point for the articles picker to pick articles, so that the travel distance of articles picker is reduced, and the time consumption is shortened; a same order can be recommended to a plurality of articles pickers, so that order delay caused by busy or leaving of the articles pickers is avoided, thus the articles picking efficiency is improved.

Figure 2:
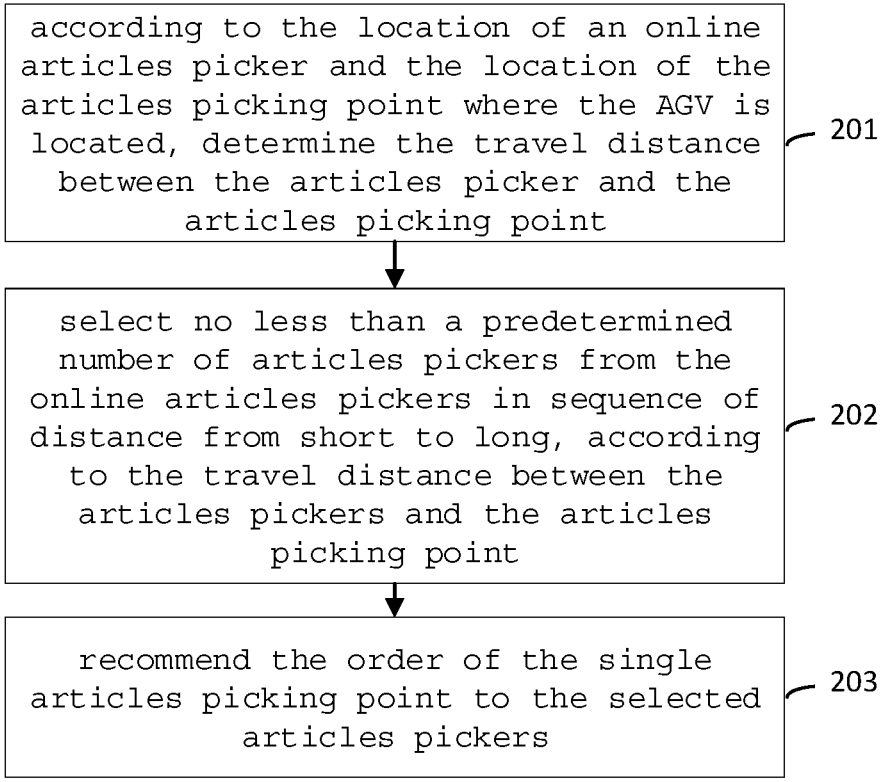
FIG. 2 is a flow diagram of some embodiments of assigning an articles picker to an order of single articles picking point in an articles picking method of the present disclosure.

In some embodiments, since the articles pickers are distributed at different positions, choosing the nearest articles pickers to recommend the order of the single articles picking point can reduce the distance the articles picker travels, save manpower, meanwhile the waiting time of the articles picker will be shorten, and the picking efficiency will be improved. In some embodiments, the flow diagram for assigning the order of the single articles picking point to one or more articles picker is shown in FIG. 2.

In step 201, according to the location of online articles pickers, and the location of the articles picking point where the AGV is located at, the travel distance between the articles picker and the articles picking point is determined.

In some embodiments, the location of the online articles pickers are updated when the articles pickers need to be recommended, thus the real-time property of their location can be improved. In other embodiments, the location of articles pickers are obtained when the articles pickers perform refresh operation to request orders, thus frequency of performing positioning operations is reduced, and data processing pressure on the articles picker terminal and system is reduced.

In step 202, according to the travel distance between the articles picker and the articles picking point, no less than a predetermined number of articles pickers are selected from the online articles pickers in order of the travel distance from short to long. In some embodiments, the articles picker refreshing the order can be preferentially selected, so that the articles picking task is preferentially recommended to one or more idle articles pickers to guarantee the efficiency of executing the order.

In step 203, the order of the single articles picking point is recommended to the one or more selected articles pickers.

By such method, a nearby articles picker can be prioritized selected to be recommended the order of the single articles picking point according to the locations of the AGV and the articles pickers, so that the travel distance of the articles pickers can be reduced, the waiting time of the AGV is shortened, and the picking efficiency is improved.

In some embodiments, an on-line articles picker list may be maintained according to on-line information and off-line information from articles pickers, thereby ensuring that the articles picker to whom the order is assigned is in an on-line state, and avoiding the delay in executing the order.

In some embodiments, to avoid excessive recommended orders to the articles picker, orders distribution may be delayed for AGVs arriving at the articles picking point, thus to ensure the number in the articles picker's list of orders to pick does not exceed a predetermined order number threshold, thereby avoiding order picking delays that may be unexpected due to longer time instances.

In some embodiments, the articles picker can refresh manually, and the articles picker terminal sends a task refresh request to the system. An order of a single articles picking point is recommended to the articles picker after receiving the task refreshing request. If there is an order to be recommended, the order can be preferentially recommended to the articles picker, so that the picking order is preferentially recommended to the idle order articles pickers to guarantee the efficiency of executing the order.

In some embodiments, after refreshing the order for an articles picker, the operation of recommending the order of single articles picking point to articles pickers within the same articles picking point area according to the task refresh requests, until executing a predetermined interval, wherein the predetermined interval can be 2-5 seconds, so that the problem that the order is picked by a plurality of goods pickers, which due to the fact that the task lists belonging to the goods pickers can be refreshed simultaneously in a short time, is avoided, and the reliability of the system is improved.

In some embodiments, when the articles picker does not refresh the order within the predetermined duration, the location of the order articles picker is deleted, so as to avoid assigning orders to the articles picker, thereby the balanced allocation effect of the order, and avoiding the delay of order picking, which due to the fact that the workload of the articles picker is too heavy, or the difficulty of order recommendation calculation caused by the congestion at the location of the articles picker on map.

In some embodiments, it can be determined that the articles picker takes the order of single articles picking point successfully when the articles picker triggers an identification of AGV. For example, a two-dimensional code is added to the AGV, and the articles picker terminal scans the two-dimensional code to take the order of the single articles picking point of the AGV at this articles picking point, or a triggering device is added to the AGV, and the articles picker takes the order by touching or pressing the triggering device. By this method, it can be confirmed that an articles picker has arrived at the AGV position to take the order, avoiding the order being taken repeatedly, and also avoiding the order being taken by an articles picker by mis operation without being aware of it, and ensuring the order of the single articles picking point being picked as soon as possible.

In some embodiments, a performance evaluation may be performed on articles pickers, and the order of the single articles picking point is recommended to the articles pickers based on their performance. For example, when the number of recommended orders is equivalent, orders are recommended to articles pickers with higher efficiency first, so that the articles pickers for subsequent orders are allocated according to the expected completion order of the existing orders on the present picking point, which further improves the order picking efficiency.

In some embodiments, when multiple AGVs arrive at a same articles picking point, the orders may be recommended to the articles picker according to a arrival sequence of the AGVs, or according to the priorities of the orders associated with the AGVs, and the order of the single articles picking point with a higher priority is preferentially recommended to the articles pickers, so as to preferentially ensure the completion efficiency of the order with the higher priority.

Figure 3:
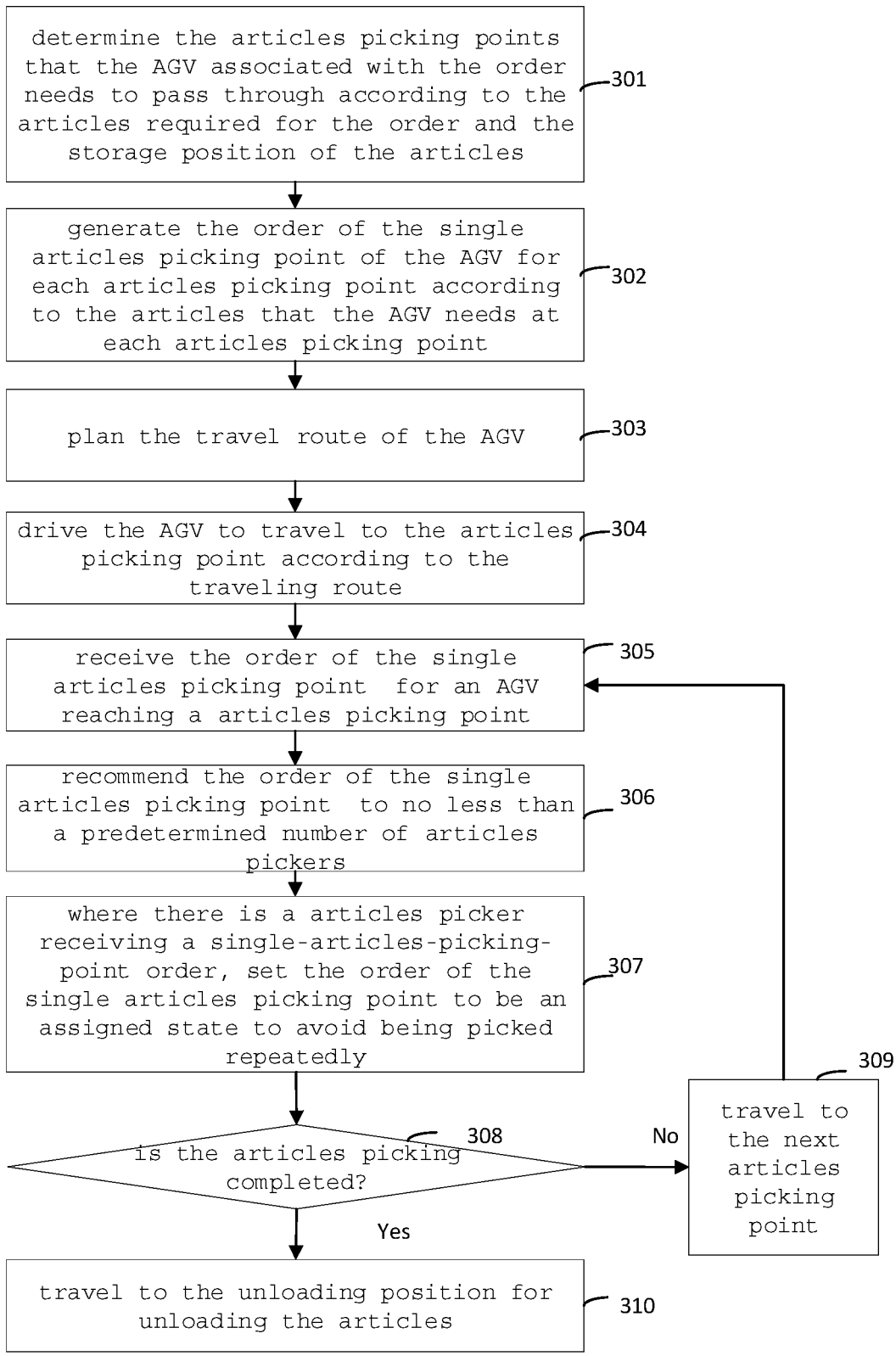
FIG. 3 is a flow diagram of further embodiments of the articles picking method of the present disclosure.

A flow chart of further embodiments of the articles picking method of the present disclosure is shown in FIG. 3.

In step 301, articles picking points that the AGV associated with the order needs to pass through is determined according to the articles required by the order and the storage positions of the articles. In some embodiments, the articles picking points that need to be passed by an AGV associated with one or more orders may be determined based on the corresponding relationship between the stored articles and the storage position.

In step 302, an order of a single articles picking point of the AGV for each articles picking point is generated, according to the articles that the AGV needs at each articles picking point. In some embodiments, orders are split according to the types of articles easy to be selected and picked at the respective articles picking points, and an order of a single articles picking point is generated for each articles picking point respectively. In other embodiments, items belonging to different orders which locate at the same articles picking point, may be combined, thus an order of a single articles picking point which includes articles desired by multiple orders is formed.

In step 303, a travel route of the AGV is planned. In some embodiments, the travel route may be programmed according to the location of the articles picking point that the AGV needs to pass, the current location of the AGV, and the location of the unloading point, so as to minimize the route.

In other embodiments, in consideration of the difference in the number of AGVs waiting at each articles picking point, the number of AGVs waiting at each articles picking point may be taken as a consideration factor. The articles picking points with a small number of waiting AGVs are selected preferentially, so as to reduce waiting time, improve the balance degree of the number of tasks at each articles picking point, and optimize order picking efficiency.

In step 304, the AGV is driven through each pick point in sequence along the travel route until the order picking is completed. In some embodiments, the travel route may be adjusted in real time according to the picking pressure state of each articles picking point during the process of the AGV passing articles picking points, so as to improve the timeliness of the route planning.

In step 305, the system receives the order of the single articles picking point of the AGV reaching the articles picking point.

In step 306, the order of the single articles picking point is recommended to no less than a predetermined number of articles pickers. In some embodiments, the order may be determined to be recommended to one or more articles pickers according to the online status of the articles pickers, the availability of the articles pickers, the location of the articles picking point, and the location of the articles pickers, and the number of articles pickers to whom the order is recommended can also be determined. In some embodiments, the number of articles pickers to whom the orders are recommended may be increased in any of the circumstances that, the number of orders to be taken and executed are greater than a predetermined number threshold, or the number of online articles pickers is greater than a threshold of predetermined people number, thereby full advantage of multiple articles pickers is taken, the time of picking up the order of the single articles picking point is reduced, and the execution efficiency is improved.

In step 307, when there is an articles picker take the order of the single articles picking point, the order of the single articles picking point is set to be an assigned state to avoid being picked repeatedly.

In step 308, it is determined whether articles picking of the AGV is complete. If the articles picking is completed, step 310 is performed; if articles picking is not complete, i.e., the AGV should still travel to the next articles picking point, and step 309 is performed.

In step 309, the AGV is driven away from the current articles picking point to the next articles picking point along the travel route.

In step 310, the AGV is driven away from the current articles picking point to an unloading point for unloading.

By such method, AGV travel route planning and order processing are performed according to articles required by orders and the storage positions where the articles are placed. The orders of the single articles picking point for each articles picking point are generated, and AGV travel routes which between the articles picking points, and from the articles picking points to the unloading points are generated, and the articles picking efficiency is guaranteed.

Figure 4:
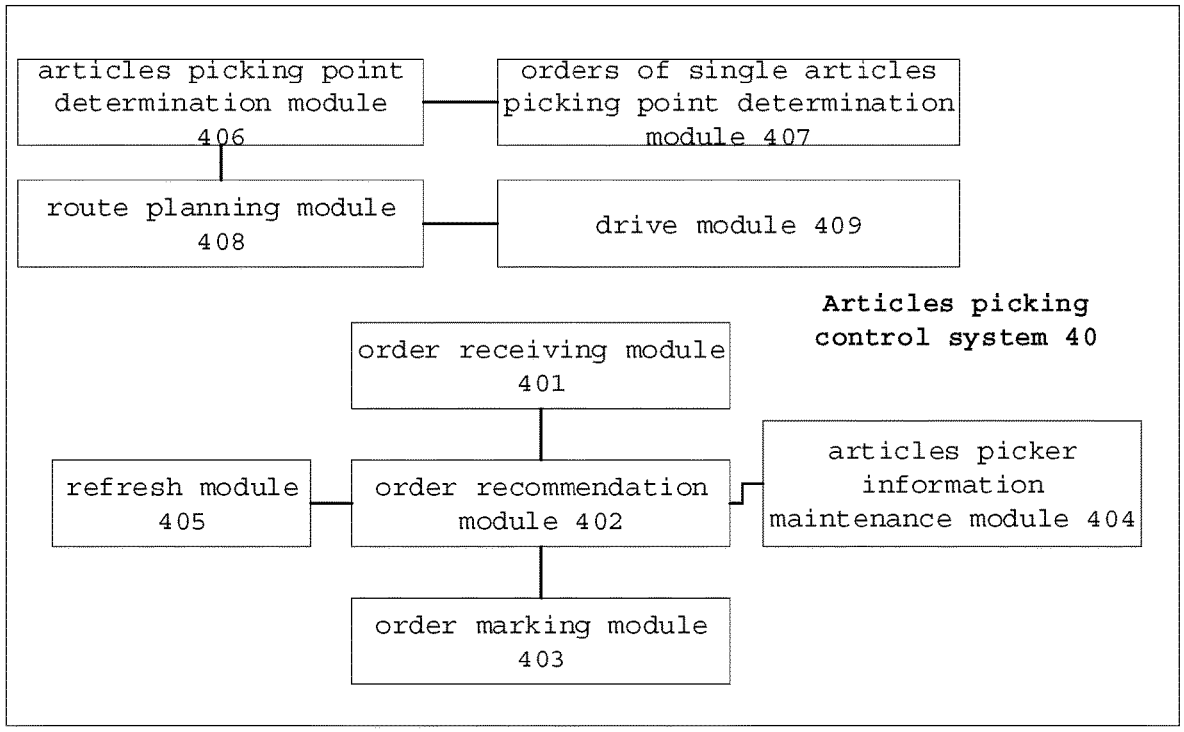
FIG. 4 is a schematic diagram of some embodiments of the articles picking control system of the present disclosure.

A schematic diagram of some embodiments of the articles picking control system 40 of the present disclosure is shown in FIG. 4. The order receiving module 401 is capable of receiving an order of a single articles picking point of an AGV arriving at an articles picking point. The order of the single articles picking point including information of articles belonging to an individual articles picking point in an order associated with the AGV. In some embodiments, the information of articles may include one or more of names, models, barcodes, two-dimensional codes, or other articles identification information, and may further include a desired quantity of the articles. The order recommendation module 402 can recommend the order of the single articles picking point to no less than a predetermined number of articles pickers. In some embodiments, the predetermined number of articles pickers is 2. The order marking module 403 is capable of setting the order of the single articles picking point to be an assigned state to avoid the order being repeatedly picked, when the order of the single articles picking point is taken by an articles picker.

The control system can associate the AGV with the order, and the AGV can be used to travel to each articles picking point for the articles picker to pick articles, so that the travel distance of articles picker is reduced, and the time consumption is shortened; a same order can be recommended to a plurality of articles pickers, so that order delay caused by busy or leaving of the articles pickers is avoided, thus the articles picking efficiency is improved.

In some embodiments, the order recommendation module 402 determines a travel distance between each articles picker and the articles picking point, according to positions of online articles pickers and a position of the articles picking point in which the AGV locating, and then articles pickers of no less than a predetermined number from the online articles pickers according to a travel distance between each articles picker and the articles picking point, so that nearer articles pickers to recommend the order of the single articles picking point can be selected according to the location of the AGV and the locations of the articles pickers, thereby reducing a travel distance of the articles pickers, shortening a waiting time of the AGV, and improving picking efficiency.

In some embodiments, the articles picking control system 40 further includes an articles picker information maintenance module 404, which capable of maintaining a list of online articles pickers according to on-line information and off-line information from the articles pickers, thereby ensuring that the articles pickers to whom the orders are assigned are in an online state, thus to avoid delay of executing the orders.

In some embodiments, the articles picker may refresh manually, and the articles picker terminal sends a task refresh request. The articles picking control system 40 may also include a refresh module 405, which capable of recommending the order of the single articles picking point to the articles picker after receiving the task refreshing request. If there is an order to be recommended, the order can be preferentially recommended to the articles picker, so that the picking order is preferentially recommended to the idle order articles pickers to guarantee the efficiency of executing the order.

In some embodiments, the articles picking control system 40 also includes an articles picking point determination module 406, an orders of single articles picking point determination module 407, a route planning module 408, and a drive module 409.

The articles picking point determination module 406 can determine the articles picking points that need to be passed by the AGV associated with the order according to the articles required for the order and the storage position of the articles. In some embodiments, the articles picking points that need to be passed by the AGV associated with the order may be determined according to the correspondence between the stored articles and the storage position.

The order of single articles picking point determination module 407 can generate orders of the single articles picking point of the AGVs for each articles picking point, according to the articles desired by the AGVs at each articles picking point. In some embodiments, orders are split according to the types of articles easy to be selected and picked at the respective articles picking points, and an order of a single articles picking point is generated for each articles picking point respectively. In other embodiments, items belonging to different orders which locate at the same articles picking point, may be combined, thus an order of a single articles picking point which includes articles desired by multiple orders is formed.

The route planning module 408 can plan the travel route of the AGV. In some embodiments, the travel route may be programmed according to the location of the articles picking point that the AGV needs to pass, the current location of the AGV, and the location of the unloading point, so as to minimize the route. In other embodiments, in consideration of the difference in the number of AGVs waiting at each articles picking point, the number of AGVs waiting at each articles picking point may be taken as a consideration factor. The articles picking points with a small number of waiting AGVs are selected preferentially, so as to reduce waiting time, improve the balance degree of the number of tasks at each articles picking point, and optimize order picking efficiency. In some embodiments, the route planning module 408 may adjust the travel route in real time according to the picking pressure state of each articles picking point during the process of the AGV passing articles picking points, so as to improve the timeliness of the route planning.

The drive module 409 can drive the AGV to sequentially pass each articles picking point according to the traveling route until the order picking is completed. In some embodiments, the travel route may be adjusted in real time according to the picking pressure state of each articles picking point during the process of the AGV passing articles picking points, so as to improve the timeliness of the route planning.

Such a control system can plan the AGV paths and process orders according to articles required by orders and the storage positions where the articles are placed. The orders of the single articles picking point for each articles picking point are generated, and AGV travel routes which between the articles picking points, and from the articles picking points to the unloading points are generated, and the articles picking efficiency is guaranteed.

Figure 5:
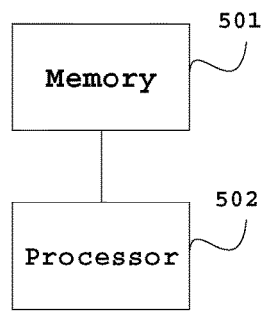
FIG. 5 is a schematic diagram of further embodiments of the articles picking control system of the present disclosure.

A schematic structural diagram of some embodiments of the articles picking control system of the present disclosure is shown in FIG. 5. The articles picking control system comprises a memory 501 and a processor 502, wherein the memory 501 may be a magnetic disk, a flash memory, or any other non-volatile storage medium. The memory is adapted to store the instructions in the corresponding embodiments of the articles picking method as mentioned above. Coupled to the memory 501 is a processor 502, which may be implemented as one or more integrated circuits, such as a microprocessor or microcontroller. The processor 502 is configured to execute instructions stored in memory to realize the effect of improving the efficiency of articles picking.

Figure 6:
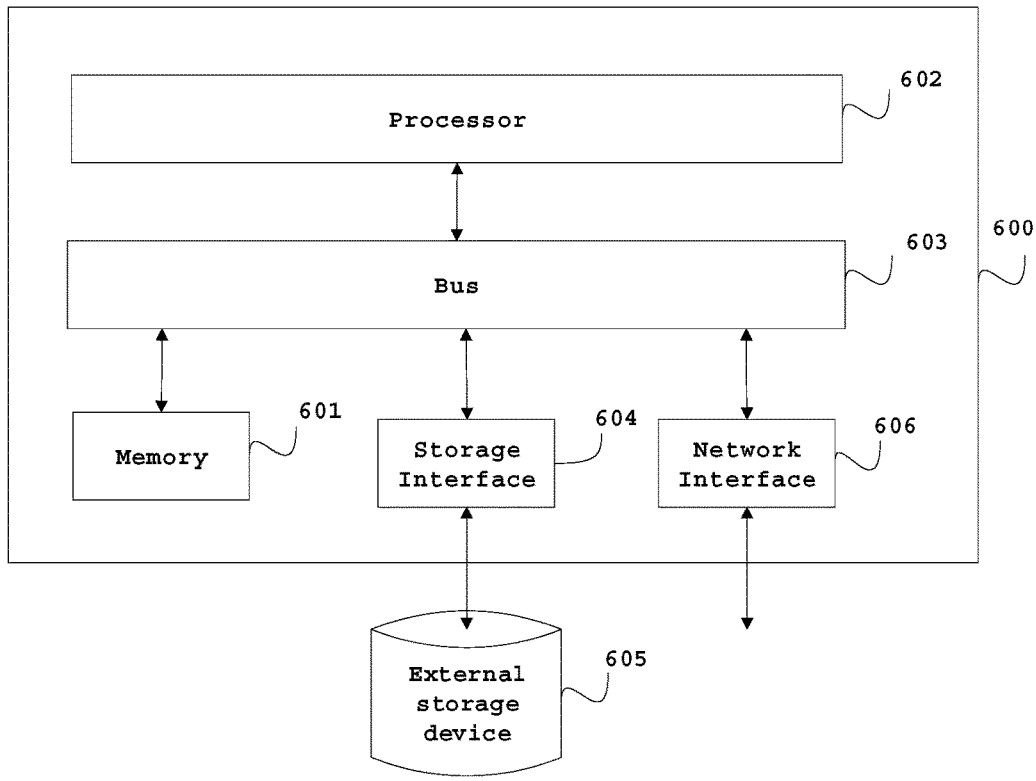
FIG. 6 is a schematic diagram of yet other embodiments of articles picking control system of the present disclosure.

In some embodiments, as also shown in FIG. 6, the articles picking control system 600 includes a memory 601 and a processor 602. Processor 602 is coupled to memory 601 through a BUS 603. The articles picking control system 600 may also be connected to an external storage 605 via a storage interface 604 for retrieving external data, and may also be connected to a network or another computer system (not shown) via a network interface 606. Further detail is omitted herein.

In the embodiment, the data instruction is stored in the memory, and then processed by a processor, which may improve the efficiency of articles picking.

In further embodiments, a computer-readable storage medium has stored thereon computer program instructions which, when executed by a processor, implement the steps of the method in the corresponding embodiments of the articles picking method. As will be appreciated by one of skill in the art, embodiments of the present disclosure may be provided as a method, apparatus, or computer program product. Accordingly, the present disclosure may take the form of an entirely hardware embodiment, an entirely software embodiment or an embodiment combining software and hardware aspects. Furthermore, the present disclosure may take the form of a computer program product implemented on one or more computer-usable non-transitory storage media (including, but not limited to, disk storage, CD-ROM, optical storage, and so forth) having computer-usable program code embodied therein.

Figure 7:
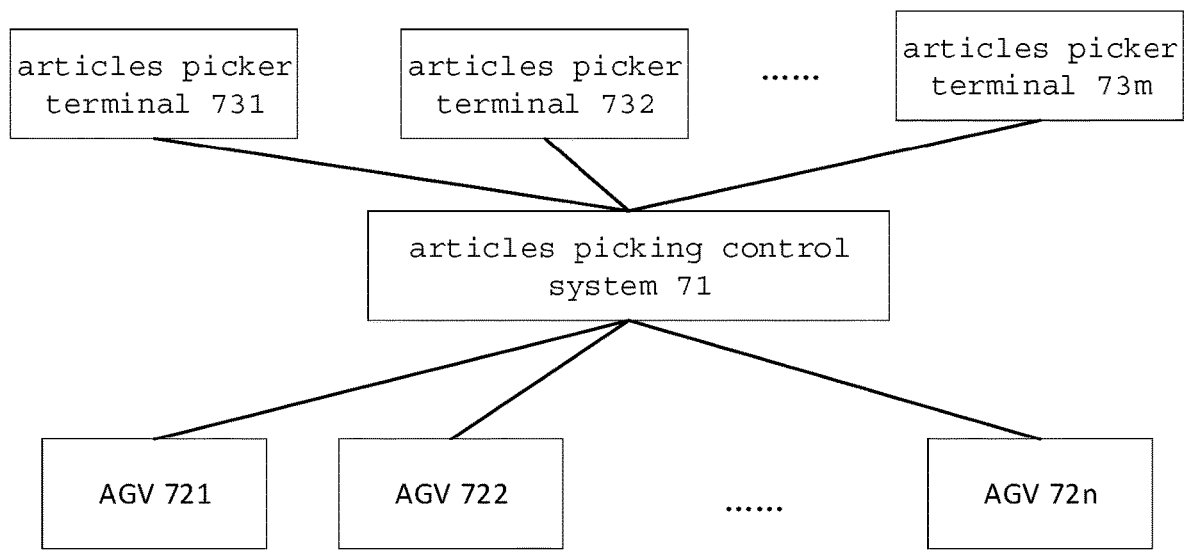
FIG. 7 is a schematic diagram of some embodiments of the articles picking system of the present disclosure.

A schematic diagram of some embodiments of the articles picking system of the present disclosure is shown in FIG. 7. The articles picking control system 71 may be any of the articles picking control systems mentioned above. The AGVs 721-72n (n is a positive integer) can travel to each of the articles picking points under the driving of the articles picking control system, and travel to the unloading point for unloading after the articles picking is completed.

The articles picking system can associate the AGV with orders, and AGV can be used to travel to each articles picking point for the articles picker to pick articles, so that the travel distance of articles picker is reduced, and the time consumption is shortened; a same order can be recommended to a plurality of articles pickers, so that order delay caused by busy or leaving of the articles pickers is avoided, thus the articles picking efficiency is improved.

In some embodiments, as shown in FIG. 7, the articles picking system may further include articles picker terminals 731-73m (m is a positive integer), the articles picker terminals are capable of performing at least one of: providing on-line information and off-line information of an articles picker to the articles picking control system under the trigger of the articles picker; receiving and displaying an order of a single articles picking point recommended to the articles picker; in the event that the articles picker determines to take the order, providing an order taking information to the articles sorting control system.

Such articles picking system can configure a dedicated articles picker terminal for each articles picker, thus can conveniently acquire the state information of articles pickers, facilitates the articles pickers to acquire order information, and can determine the opportunity of recommending orders according to the needs of the articles pickers, which improves the timeliness and rationality of order distribution.

Figure 8:
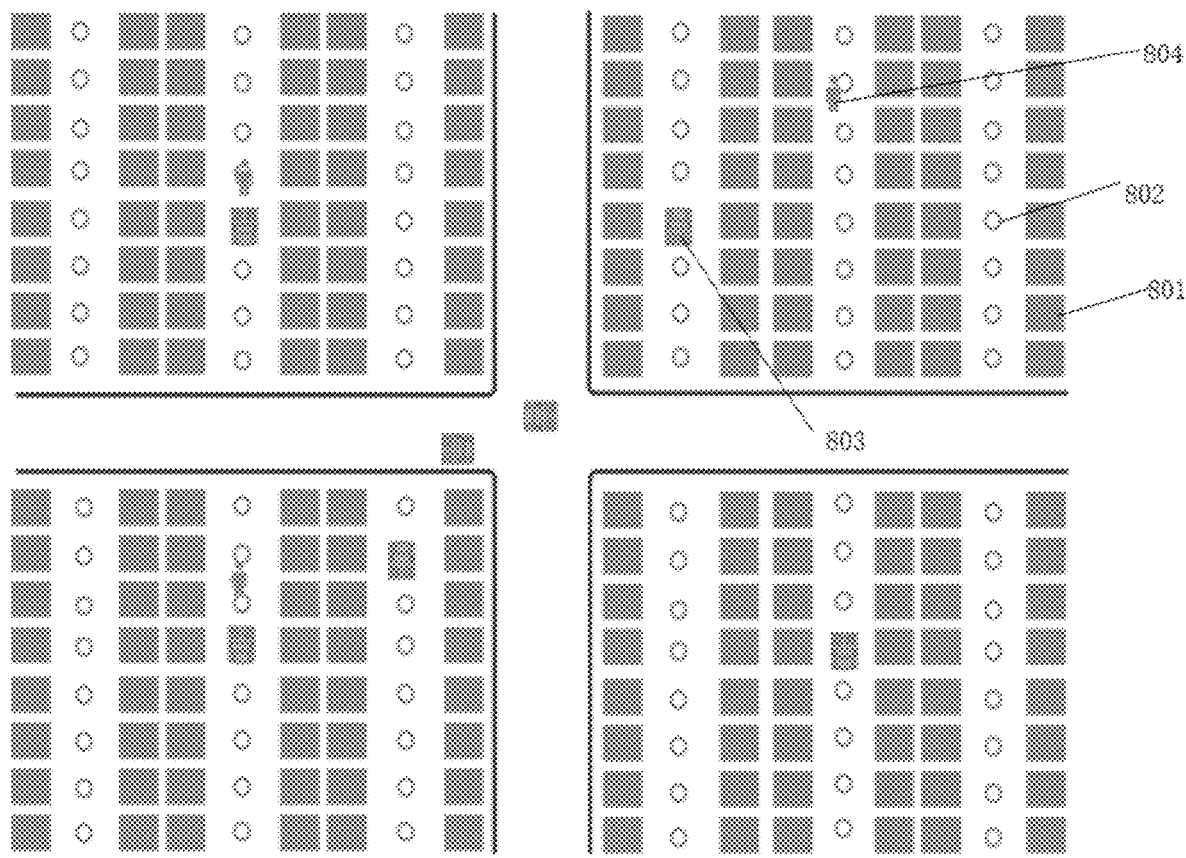
FIG. 8 is a schematic diagram of some embodiments of application environments of the articles picking system of the present disclosure.

A schematic diagram of some embodiments of an application environment of the articles picking system of the present disclosure is shown in FIG. 8. The small squares are storage position 801 marks, the small round dots are parking spot marks. The parking spots can be in one-to-one correspondence with the articles picking points 802, or a plurality of parking spots can belong to a same articles picking point. As shown by the broken lines which separate the storage position marks, the storage space is divided into a plurality of areas, for example, the illustrated area includes 4 areas, and an AGV 803 (as shown by a cart-type icon) moves among different storage areas and at different articles picking points to complete picking of articles belonging to different storage areas. Each storage area may have one or more pick-up points, and may be configured with one or more articles pickers 804 (as shown by the human icon). In some embodiments, one or more storage areas may not be configured with articles pickers, and when articles picking in such storage areas is required, articles pickers in other nearby storage areas are informed to receive orders, so as to avoid human resource waste caused by configuring articles pickers for partial unpopular storage areas.

Such system, on one hand, matches the AGV with manual articles picking, so that the flexibility of articles picking is improved, the walking distance of articles pickers are reduced, and the waste of human resources is reduced; on the other hand, the area that an articles picker is in charge of is reduced, so that the work proficiency level of the articles picker can be increased, so that the articles picking efficiency is improved.

Figure 9:
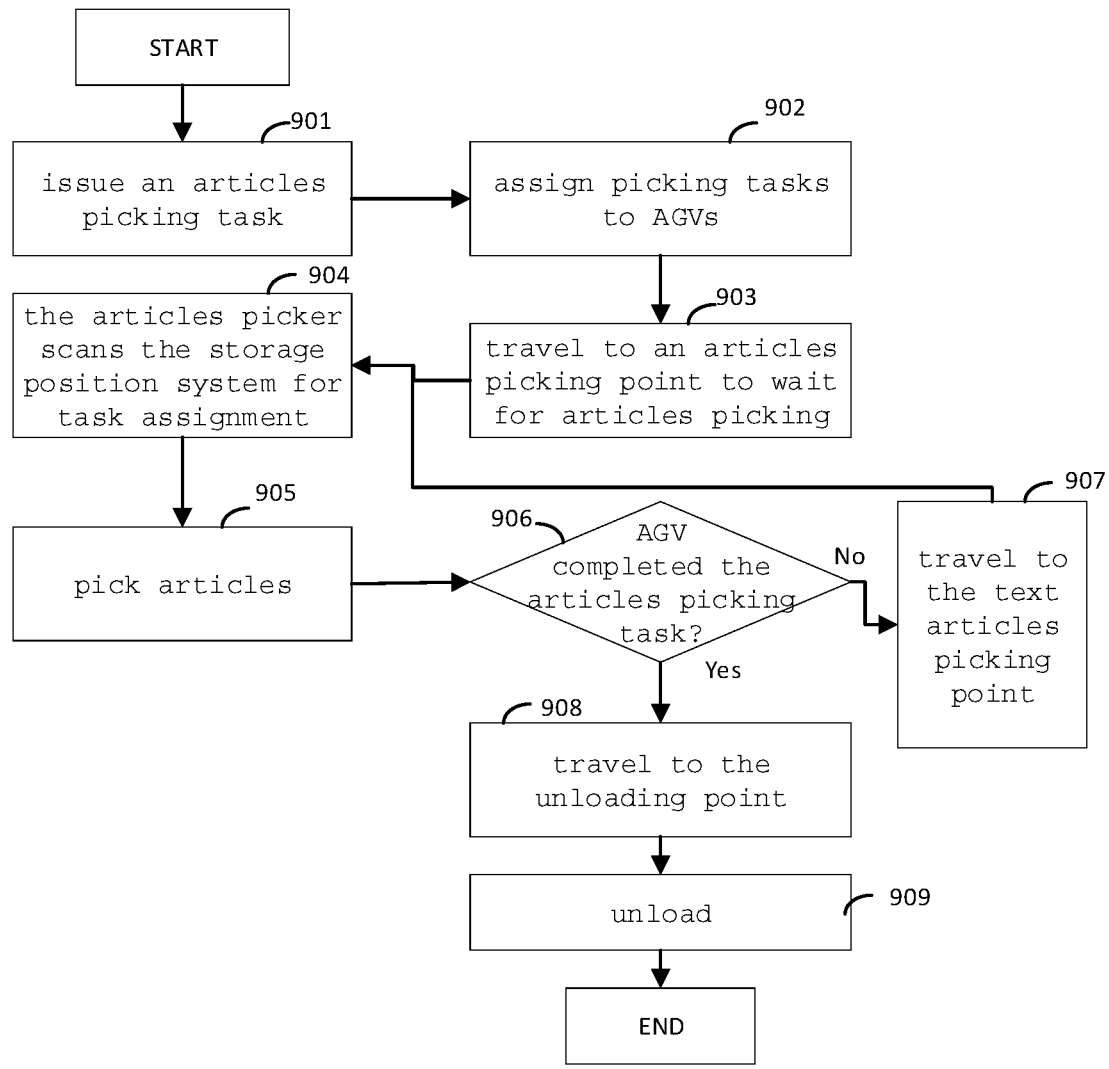
FIG. 9 is a flow diagram of some embodiments of the operational logic of the articles picking system of the present disclosure.

A flow chart of some embodiments of the operational logic of the articles picking system of the present disclosure is shown in FIG. 9.

In step 901, a WMS issues a task. In some embodiments, tasks may be issued based on order parameters, for example, orders with higher priority are processed first, and orders approaching the deadline are processed preferentially, and when orders of a same set belong to different picking tasks and there is one or more orders have been processed, other orders should be processed preferentially.

In step 902, picking tasks are assigned to AGVs, and orders of the single articles picking point are generated according to the conditions of the orders in the picking tasks, and path planning is performed. In some embodiments, one or more orders may be included in the picking task, and one AGV may be associated with one or more picking orders.

In step 903, the AGV travels to an articles picking point according to the planned route.

In step 904, a task assignment request is sent to the WMS system when the articles picker refreshes to request for the assignment of a task. In some embodiments, the order articles picker can request the assignment of task by refreshing the terminal page, to make it convenient for using by the articles picker. In other embodiments, the articles picker may scan the storage position marks to request for the assignment of task, thereby realizing the transmission of the task assignment request on one hand and facilitating the system to determine the position of the articles picker according to the storage position marks scanned by the articles picker on the other hand.

In step 905, the articles picker picks articles according to the detail of articles in the order of the single articles picking point that has been received.

In some embodiments, when the articles picker completes picking of the last item in the order of the single articles picking point, the articles picker is automatically assigned an order associated with an AGV waiting again. In some embodiments, if there are no AGVs waiting, the system prompts no tasks. The system records the articles picker's position in the storage position and delete the marker after a period of time if there is no refreshing.

In some embodiments, it is assumed that there is at least one articles picker in the logical area (the logical area is a name of an area in data processing corresponding to a storage area, and the corresponding storage area may be a storage region in a predetermined range, a picking region within a predetermined distance, etc.). The positions of the articles pickers are relatively accurate, and excessive repeated recommending is avoid while ensuring that the tasks are recommended to a plurality of articles pickers in the recommendation principle.

Suppose that there are n online articles pickers in charge of the logical area in the present logical area, and the positions of the articles pickers in the logical area are $S_1, \ldots, S_n$, and the positions of AGVs at the articles picking point in the current logical area are $C_1, \ldots, C_m$, and the distance between the ith articles picker and the jth AGV is indicated by the shortest distance of the nodes where the two are located, i.e., $d(S_i, C_j)$.

The variable $x_{ij}$ is used to represent whether a task is recommended to the articles picker i:

$$x_{ij} = \begin{cases} 0, & \text{task } j \text{ is not recommended to the picker } i, \\ 1, & \text{task } j \text{ is recommended to the picker } i \end{cases}.$$

Consider the following model:

$$\min \sum_{ij} d(S_i, C_j) x_{ij}$$

$$\text{s.t.} \sum_i x_{ij} \geq p \quad (1)$$

$$\sum_j x_{ij} \geq q \quad (2)$$

$$x_{ij} \in \{0, 1\},$$

constraints (1) indicate that each AGV task is to be recommended to at least p articles pickers, p=min{2, n}. When n=1, each AGV task can only be recommended to one articles picker; when n≥2, each AGV task is at least recommended to two articles pickers.

constraints (2) indicate that each articles picker must be recommended at least q picking tasks, $$q = \min\left\{5, \frac{pm}{n}\right\}.$$

The constraint (2) is to balance the recommendations and prevent situations where some articles picker recommendation lists are empty or have too many orders. Specifically, 5 in $$q = \min\left\{5, \frac{pm}{n}\right\}$$

is to ensure that each articles picker is assigned at least 5 tasks, but when there are m tasks (the coefficient is p, indicating that each task is to appear at least p times), to distribute the trolley tasks as evenly as possible, each RF only has to display $$\frac{pm}{n}$$

tasks. Considering the case where $$\frac{pm}{n}$$

is less than 5, only the minimum value of $$\frac{pm}{n}$$

and 5 is taken. (Note that given the solution, each task may occur more than twice).

As is readily apparent from the model, the model has a feasible solution. $\forall i$, $\Sigma_j x_{ij}$ is the number of tasks assigned to the articles picker i, $x_{ij}=1$ indicates that the task j will be assigned to the articles picker i. As for all the tasks j satisfying $x_{ij}=1$, the tasks are arranged in an ascending order of the weight $rd_j$, thereby to control the sequence that the order of the single articles picking point is taken by the articles pickers. In some embodiments, it may be set that $rd=f(r_1, r_2, r_3)$, and $r_1$ is set to reflect the level of priority of the task, and $r_2$ reflects the proximity of the relative order-taking closure time, $r_3$ reflects the waiting time of the AGV, and f may be set according to the specific service requirements.

In some embodiments, it may be provided that $f(r_1, r_2, r_3)=r_1 r_2 r_3$, and higher the task priority is, closer to the order-taking closure time the task is, or longer the AGV waiting time in the tunnel is, the lower the corresponding parameter values are. For example, when the waiting time of the AGV carrying the task j in the tunnel exceeds a certain threshold value, the value $r_3$ of the AGV carrying the task j is reduced to improve the task's $rd_j$. When the task with a high priority must be performed preferentially, $r_1$ corresponding to the task with high priority could be made to be close to 0. The values of the specific parameters can be adjusted appropriately in actual operation according to requirements.

When there is an articles picker scanning a storage position to trigger the refreshing of task assignment, the articles picking tasks which are not taken can be recommended again. To avoid there are multiple people refresh the assignment task list for a short time, the order recommendation lists of articles pickers near a same area are not refreshed within a certain time limit (e.g., 3 s).

In step 906, it is determined whether the AGV has completed the articles picking task, and if so, step 908 is performed, and if not, step 907 is performed. In some embodiments, the AGV may determine whether to complete the articles picking task according to the planned articles picking route.

In step 907, the AGV travels to the next articles picking point, and executes step 904 for the articles picking operation at the articles picking point.

In step 908, the AGV travels to the unloading point.

In step 909, the AGV completes the unloading operation, either automatically or by an unloader.

Such system letting the AGV associated with the picking tasks collaborate with different articles pickers for picking articles as introduced, achieves accurate assignment of articles picking tasks by taking into account the positions of the articles pickers, reduces the invalid walking distance of the articles pickers, and improves the efficiency of the articles picking task. Meanwhile, the use of way that the AGV collaborates with the articles pickers does not need to lay tracks between articles picking points, and the sequence of AGV passing through each articles picking point is not fixed, which improves the flexibility and further improves the efficiency of articles picking.

The present disclosure is described with reference to flow diagrams and/or block diagrams of the methods, apparatus (systems) and computer program products according to embodiments of the disclosure. It will be understood that each flow and/or block of the flowchart illustrations and/or block diagrams, and combinations of flows and/or blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions, which are executed via the processor of the computer or other programmable data processing apparatus, create means for implementing the functions specified in the flowchart flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart flow or flows and/or block diagram block or blocks.

These computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart flow or flows and/or block diagram block or blocks.

Thus far, the present disclosure has been described in detail. Some details well known in the art have not been described in order to avoid obscuring the concepts of the present disclosure. Those skilled in the art can now fully appreciate how to implement the teachings disclosed herein, in view of the foregoing description.

The methods and apparatus of the present disclosure may be implemented in a number of ways. For example, the methods and apparatus of the present disclosure may be implemented by software, hardware, firmware, or any combination of software, hardware, and firmware. The above-described order for the steps of the method is for illustration only, and the steps of the method of the present disclosure are not limited to the order specifically described above unless specifically stated otherwise. Further, in some embodiments, the present disclosure may also be implemented as programs recorded in a recording medium, the programs including machine-readable instructions for implementing the methods according to the present disclosure. Thus, the present disclosure also covers a recording medium storing a program for executing the methods according to the present disclosure.

Finally, it should be noted that: the above examples are intended only to illustrate the technical solution of the present disclosure and not to limit it; although the present disclosure has been described in detail with reference to preferred embodiments, those of ordinary skill in the art will understand that: modifications to the specific embodiments of the disclosure or equivalent substitutions for parts of the technical features may be made; all of which are intended to be covered by the scope of the claims of this disclosure without departing from the spirit thereof.

What is claimed is:

1. An articles picking method, comprising:
    receiving an order of a single articles picking point of an AGV arriving at an articles picking point, wherein the order of the single articles picking point comprises information of articles belonging to a same articles picking point in one or more user orders associated with the AGV;
    recommending the order of the single articles picking point to articles pickers of no less than a predetermined number; and
    setting the order of the single articles picking point to be an assigned state in case where an articles picker takes the order of the single articles picking point to avoid the order of the single articles picking point being picked repeatedly, wherein the articles picker takes the order of the single articles picking point, performs articles picking operation, and the order of the single articles picking point in the assigned state is stopped from being recommended to articles pickers.

2. The articles picking method according to claim 1, wherein recommending the order of the single articles picking point to articles pickers of not less than a predetermined number comprises:
    determining a travel distance between each online articles picker and the articles picking point, according to positions of the online articles picker and a position of the articles picking point where the AGV is located, wherein online articles picker is an article picker who is available on the internet or other computer network;
    selecting articles pickers of no less than the predetermined number from the online articles pickers according to a travel distance between each articles picker and the articles picking point, as selected articles pickers; and
    recommending the order of the single articles picking point to the selected articles pickers.

3. The articles picking method according to claim 2, further comprising:
    generating a list of articles pickers according to the online articles pickers, and obtaining the position of articles pickers in the list of articles pickers;
    maintaining the list of online articles pickers according to on-line information and off-line information of each articles picker; and
    updating the position of each articles picker in the list of online articles pickers in the articles picking point area before determining the travel distance between each articles picker and the articles picking point.

4. The articles picking method according to claim 1, wherein recommending the order of the single articles picking point to articles pickers of no less than a predetermined number comprising:
    sending the order of the single articles picking point to an articles picker terminal according to a task refresh request from the articles picker terminal, wherein in a case where the articles picker performs refreshing operation on the articles picker terminal, the articles picker terminal sends a task refresh request; and
    in a predetermined interval, suspending an operation of recommending the single articles picking point according to the task refresh request to articles pickers which locates in a same articles picking point area with the articles picker terminal.

5. The articles picking method according to claim 1, further comprising:
    determining articles picking points to be passed by an AGV associated with the user order, according to articles required by the user order and the storage positions of the articles;
    generating orders of the single articles picking point of the AGV for each articles picking point, according to the articles that the AGV needs at each articles picking point;
    planning a traveling route of the AGV; and
    driving the AGV to sequentially pass through each articles picking point according to the traveling route.

6. The articles picking method according to claim 5, wherein each AGV is associated with one or more orders, and
    the order of the single articles picking point comprises information of articles belonging to one or more orders.

7. The articles picking method according to claim 5, wherein the information according to which the travel route of the AGV is planned comprises
    positions of the articles picking points that the AGV need to pass, position of an unloading point and a current position of the AGV.

8. The articles picking method according to claim 5, further comprising:
when the articles picker assigned with the order of the single articles picking point has finished the order of the single articles picking point, driving the AGV, to which the order of the single articles picking point belongs, to leave a current articles picking point and go to a next articles picking point according to the traveling route.

9. An articles picking control system comprising:
an order receiving module, configured to receive an order of a single articles picking point of an AGV arriving at an articles picking point, wherein the order of the single articles picking point comprises information of articles belonging to a same articles picking point in one or more user orders associated with the AGV;
an order recommendation module, configured to recommend the order of the single articles picking point to articles pickers of no less than a predetermined number; and
an order marking module, configured to set the order of the single articles picking point to be an assigned state in a case where an articles picker takes the order of the single articles picking point, to avoid the order of the single articles picking point being picked repeatedly, wherein the articles picker takes the order of the single articles picking point performs articles picking operation, and the order of the single articles picking point in the assigned state is stopped from being recommended to articles pickers.

10. An articles picking control system, comprising:
a memory; and
a processor coupled to the memory, wherein the processor is configured to perform a method according to claim 1 based on instructions stored in the memory, wherein the instructions are computer program instructions executable by the processor.

11. A non-transitory computer-readable storage medium having stored thereon computer program instructions which, when executed by a processor, implement steps of a method according to claim 1.

12. An articles picking system, comprising:
a memory; and
a processor coupled to the memory, wherein the processor is configured to, based on instructions stored in the memory:
receiving an order of a single articles picking point of an AGV arriving at an articles picking point, wherein the order of the single articles picking point comprises information of articles belonging to a same articles picking point in one or more user orders associated with the AGV;
recommending the order of the single articles picking point to articles pickers of no less than a predetermined number; and
setting the order of the single articles picking point to be an assigned state in a case where an articles picker takes the order of the single articles picking point to avoid the order of the single articles picking point being picked repeatedly, wherein the articles picker takes the order of the single articles picking point performs articles picking operation, and the order of the single articles picking point in the assigned state is stopped from being recommended to articles pickers; and the processor is further configured to:
plan a traveling route of the AGV; and
drive the AGV to sequentially pass through each articles picking point according to the traveling route; and
one or more AGVs, configured to travel to each articles picking point based on the control of the articles picking control system, and travel to an unloading point for unloading.

13. The articles picking system according to claim 12, further comprising:
one or more articles picker terminals, and each of the articles picker terminals is configured to perform one or more of the following operations:
receiving and displaying an order of a single articles picking point recommended to the articles picker; or
in the event that the articles picker determines to take the order, providing an order taking information to the articles picking control system.

14. The articles picking system according to claim 13, wherein recommending the order of the single articles picking point to articles pickers of not less than a predetermined number comprises:
determining a travel distance between each online articles picker and the articles picking point, according to positions of the online articles picker and a position of the articles picking point where the AGV is located, wherein online articles picker is an article picker who is available on the internet or other computer network;
selecting articles pickers of no less than the predetermined number from the online articles pickers according to a travel distance between each articles picker and the articles picking point, as selected articles pickers; and
recommending the order of the single articles picking point to the selected articles pickers.

15. The articles picking system according to claim 12, wherein the processor is further configured to:
generate a list of articles pickers according to the online articles pickers, and obtain the position of articles pickers in the list of articles pickers;
maintaining the list of online articles pickers according to on-line information and off-line information of each articles picker; and
update the position of each articles picker in the list of online articles pickers in the articles picking point area before determining the travel distance between each articles picker and the articles picking point.

16. The articles picking system according to claim 12, wherein the processor is further configured to:
send the order of the single articles picking point to an articles picker terminal according to a task refresh request from the articles picker terminal, wherein in a case the articles picker performs refreshing operation on the articles picker terminal, the articles picker terminal sends a task refresh request; and
in a predetermined interval, suspend an operation of recommending the single articles picking point according to the task refresh request to articles pickers which locates in a same articles picking point area with the articles picker terminal.

17. The articles picking system according to claim 12, wherein the processor is further configured to:
determine articles picking points to be passed by an AGV associated with the user order, according to articles required by the user order and the storage positions of the articles;
generate orders of the single articles picking point of the AGV for each articles picking point, according to the articles that the AGV needs at each articles picking point;

plan a traveling route of the AGV; and drive the AGV to sequentially pass through each articles picking point according to the traveling route.

18. The articles picking system according to claim 17, wherein each AGV is associated with one or more orders, and the order of the single articles picking point comprises information of articles belonging to one or more orders.

19. The articles picking system according to claim 17, wherein the information according to which the travel route of the AGV is planned comprises positions of the articles picking points that the AGV need to pass, position of an unloading point and a current position of the AGV.

20. The articles picking system according to claim 17, wherein the processor is further configured to:

when the articles picker assigned with the order of the single articles picking point has finished the order of the single articles picking point, drive the AGV, to which the order of the single articles picking point belongs, to leave a current articles picking point and go to a next articles picking point according to the traveling route.

\* \* \* \* \*